H. T. YARYAN.
Ice Machine.
No. 103,271.  Patented May 17, 1870.
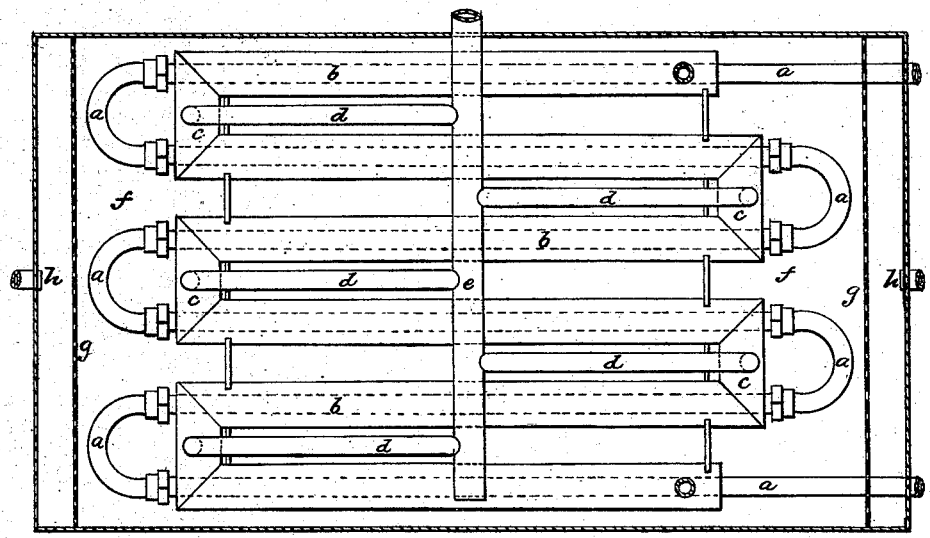

United States Patent Office.

HOMER T. YARYAN, OF NASHVILLE, TENNESSEE.

Letters Patent No. 103,271, dated May 17, 1870.

IMPROVEMENT IN APPARATUS FOR REFRIGERATING AND MAKING ICE.

The Schedule referred to in these Letters Patent and making part of the same.

*To all whom it may concern:*

Be it known that I, HOMER T. YARYAN, of Nashville, in the State of Tennessee, have invented an Improvement in Apparatus for Refrigerating Fluids and Making Ice; and the following is declared to be a correct description of the said invention.

This invention relates to an apparatus in which ether or other liquid is evaporated *in vacuo*, for making ice or cooling fluids or liquids.

In my apparatus a large surface for evaporation is obtained, and only a small quantity of the volatile fluid is required. Two different fluids or liquids can be simultaneously refrigerated.

The apparatus is very simple in construction, and contains a large extent of cooling-surface in a small space.

In the drawing—

Figure 1 is a sectional plan of the apparatus, and

Figure 2 is a section transversely of the evaporating-tubes.

The tubes $a\ a$ are connected at their ends, to form a horizontal coil, and around each tube $a$ is a second tube, $b$, forming a jacket, and these are connected to each other, as at $c$, to form a second worm.

The tubes $a$ are within the tubes $b$, and rest upon them at the bottom, and the ether or other volatile liquid is introduced in the pipes $b$, so that they are about half full.

This construction furnishes a large surface for the evaporation of the ether, and ample space for the vapors to pass away to the air-pump, through the tubes $d\ d$ and $e$.

These tubes $d\ d$ and $e$ are arranged as shown in fig 1, to equalize the vacuum-action throughout the apparatus.

The aforesaid pipes are introduced in a shallow vessel, $f$, with a cover that may be movable, if desired, and within this vessel $f$ are the screens $g\ g$, and pipes $h\ h$ are provided at the respective ends.

It will now be understood that this apparatus can be employed in cooling or refrigerating two liquids or fluids at one and the same time. For instance:

Water or other liquids can be circulated through the tubes $a\ a$, and only cooled to the proper temperature for drinking or other purposes, and, at the same time, air may be cooled by being passed through the vessel $f$, and used for cooling rooms, dwellings, hospitals, &c., thus availing of both internal and external coils of pipe. This arrangement of cooling both air and water at the same time being of great importance to brewers, whereby the beer is cooled by a circulation of cold water, while the room is kept at the proper temperature favorable to fermentation, and ventilated of its noxious vapors as well.

In order to freeze water with this apparatus, brine, or other liquid not easily congealed, is circulated through the tubes $a\ a$, and around metal boxes, containing water to be frozen, while the vessel $f$, being constructed of wood, and a poor conductor of heat, is closed tight, and acts as a protection to the pipes $b\ b$ from external heat.

The vapor of the ether or other volatile liquid is to be passed from the air-pump into a multitubular condenser, to which water is supplied, and thence allowed to return to the tubes $b$ in a regulated stream.

I claim as my invention—

1. A refrigerating or ice-making apparatus, composed of horizontal pipes passing through pipes partially filled with ether or other volatile liquid, in the manner and for the purposes specified.

2. The horizontal tubes $a$ within the tubes $b$, partially filled with ether or similar fluid, in combination with the vessel $f$, inclosing such tubes, so as to refrigerate simultaneously two fluids or liquids, substantially as set forth.

3. In combination with the tubes $a$ and $b$, the tubes $d\ d\ e$, arranged as specified, to equalize the action of the vacuum or exhaust in the apparatus, as specified.

Signed by me this 4th day of April, A. D. 1870.

HOMER T. YARYAN.

Witnesses:
JOHN L. YARYAN,
B. S. BRADDOCK.